United States Patent
Sugawara et al.

(10) Patent No.: US 8,862,390 B2
(45) Date of Patent: Oct. 14, 2014

(54) POSITION ADJUSTMENT ASSISTANCE SYSTEM FOR TRANSPORTATION MACHINE

(75) Inventors: Kazuhiro Sugawara, Tsuchiura (JP); Hiroshi Ogura, Tsuchiura (JP); Katsuaki Tanaka, Tsuchiura (JP); Teruo Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/008,230

(22) PCT Filed: Mar. 27, 2012

(86) PCT No.: PCT/JP2012/057937
§ 371 (c)(1),
(2), (4) Date: Sep. 27, 2013

(87) PCT Pub. No.: WO2012/133410
PCT Pub. Date: Oct. 4, 2012

(65) Prior Publication Data
US 2014/0019042 A1    Jan. 16, 2014

(30) Foreign Application Priority Data

Mar. 31, 2011 (JP) .................................. 2011-077205
Oct. 21, 2011 (JP) .................................. 2011-231579

(51) Int. Cl.
| | | |
|---|---|---|
| G01C 21/00 | (2006.01) | |
| E21C 41/26 | (2006.01) | |
| E02F 9/20 | (2006.01) | |
| G01S 19/45 | (2010.01) | |
| E02F 9/26 | (2006.01) | |
| G01C 21/20 | (2006.01) | |
| G08G 1/137 | (2006.01) | |
| G01C 21/36 | (2006.01) | |
| G01S 7/48 | (2006.01) | |

(52) U.S. Cl.
CPC ............ *G01C 21/3667* (2013.01); *E21C 41/26* (2013.01); *E02F 9/2045* (2013.01); *G01S 19/45* (2013.01); *E02F 9/26* (2013.01); *G01C 21/20* (2013.01); *G01C 21/005* (2013.01); *G01S 7/48* (2013.01); *G08G 1/137* (2013.01)
USPC ........................................................ 701/431

(58) Field of Classification Search
None
See application file for complete search history.

(56) References Cited

U.S. PATENT DOCUMENTS 6,484,078 B1    11/2002    Kageyama
6,668,157 B1    12/2003    Takeda et al.
(Continued)

FOREIGN PATENT DOCUMENTS

| JP | 7-205721 A | 8/1995 |
|---|---|---|
| JP | 2000-339028 A | 12/2000 |
| JP | 2001-126189 A | 5/2001 |

OTHER PUBLICATIONS

International Search Report dated Jun. 19, 2012 w/ partial English translation (three (3) pages).

*Primary Examiner* — Thomas Tarcza
*Assistant Examiner* — Adam Alharbi
(74) *Attorney, Agent, or Firm* — Crowell & Moring LLP (57) ABSTRACT

To advance a dump truck quickly and smoothly to a position where target loading work will be performed relative to an excavating machine, the dump truck is placed in loading target position relative to the excavating machine. Geographic position is detected from GPS satellites of a GPS receiver of the dump truck. The position and direction of the geographic position is transmitted to the excavating machine as a target position image. The target position image and an approach route leading to the position are displayed on a dump truck display when the truck thereafter approaches the position. The dump truck thereafter approaches the position, and the truck is driven so that a current position image advances along the approach route to the target position image, whereby the dump truck is placed in the set loading image target position.

6 Claims, 7 Drawing Sheets

(56) References Cited

U.S. PATENT DOCUMENTS

| | | | |
|---|---|---|---|
| 7,489,993 B2* | 2/2009 | Coffee et al. | 701/32.3 |
| 2006/0142913 A1* | 6/2006 | Coffee et al. | 701/35 |
| 2008/0084324 A1* | 4/2008 | Wallace et al. | 340/679 |
| 2009/0088924 A1* | 4/2009 | Coffee et al. | 701/33 |
| 2013/0054133 A1* | 2/2013 | Lewis et al. | 701/423 |

* cited by examiner

POSITION ADJUSTMENT ASSISTANCE SYSTEM FOR TRANSPORTATION MACHINE

TECHNICAL FIELD

This invention relates to a assistance system for supporting to adjust haulage machines, such as dump trucks for hauling ore from a loading machine such as an excavator for digging ore at a mine to perform relative positioning such that the haulage machines can be smoothly and quickly placed to a suitable position and in a direction for loading work from the loading machine.

BACKGROUND ART

Upon mining ore or the like at a mine, for example, an excavator having an excavation means for soil and rocks and haulage machines, such as dump trucks, for hauling materials excavated by the excavator are brought into the mining site. Excavated ore is loaded on dump trucks as the haulage machines and is hauled out of the mining site. For the purpose of mining, large-scaled hydraulic shovels are used as the excavators having their bucket capacity of 3 $m^3$ to 40 $m^3$ or more. Even if dump trucks of large capacity are also used, the vessel of each dump truck is, therefore, filled up with excavated materials loaded one to several times or so from the corresponding bucket. Therefore, plural haulage machines are kept in readiness for each loading machine, and are successively delivered to the side of the loading machine.

In a case where a haulage machine and an excavator are not arranged in proper positional relation upon loading excavated materials such as ore from the excavator to the haulage machine, time is wasted in the loading work so that the efficiency of the work is lowered. After a haulage machine, such as a dump truck, has traveled out of a loading position with its vessel being filled up, a new haulage machine is approached for a replacement. The mining work should be interrupted while the dump truck is being replaced. In order to bring the haulage machine to the proper position, steering or the like may be repeated right and left until the new haulage machine is placed at the proper position, a large time should be spent until the new haulage machine is placed at the proper position, so that the efficiency of the work is also lowered.

In the event that a haulage machine is moved to the final position, the haulage machine is normally driven backwardly to allow its vessel to be closed at a suitable loading position from an excavator. In the case of a dump truck for ore haulage, a backward field of vision from its driver's seat can only be obtained from a rearview mirror, so that an operation to place the dump truck at a proper position by reversing it involves further difficulties. In this respect, for example, Patent Document 1 is disclosed a construction that to obtain a field of vision to the rearward side of a vehicle, a back eye camera is mounted on a rear position of the vehicle, a back eye display is arranged in a cab, and an image of the rearward side of the vehicle from the back eye camera is displayed on the back eye display.

PRIOR ART DOCUMENT

Patent Document

Patent Document 1: JP-A-7-205721

DISCLOSURE OF THE INVENTION

Problem to Be Solved By the Invention

A back eye camera arranged on a dump truck requires to protect free from strike with rocks or the like upon loading them into its vessel. In Patent Document 1, the back eye camera is, therefore, arranged at the position of a lower part of the vessel and at a retreated position from the distal end thereof. Accordingly, the range of field of vision by the back eye camera is restricted and, moreover, at a position close to another machine, an image of the machine is shown only partially on the display. The mere presentation of an image from the back eye camera on the display is, hence, insufficient as a lead for smoothly performing, on the side of the haulage machine, work to adjust such that the haulage machine can be brought into a predetermined positional relation relative to a loading machine.

With the foregoing problem in view, an object of the present invention is to support for each haulage machine on performing relative positioning such that it can be placed at a proper position and in a direction suitable for loading work from a loading machine.

Means for Solving the Problem

To achieve the above-described object, the present invention is an assistance system of haulage machines for positioning of said haulage machines to place at a target loading position for loading work from a loading machine, comprising: a control circuit provided for said haulage machines to prepare information as to said target loading position for said haulage machines, a wireless communication apparatus for transmitting said target loading position information from said loading machine to each of said haulage machines, a haulage machine detector for acquiring data about a current position of each of said haulage machines, and a display provided on each of said haulage machines to show said target loading position for said haulage machine and a current position of said haulage machine.

The loading machine can be an excavator such as a hydraulic shovel, a crane, or other industrial machine, and makes up a self-propelling industrial machine, while the haulage machines can be haulage vehicles such as dump trucks. A representative of a field site where acts these loading machine and haulage machines is a mine. Upon mining ore at a mine, hydraulic shovels are operated as excavators, and dump trucks are operated as haulage vehicles. Many dump trucks are allocated per every excavator. When a plural number of excavators are operated, a large number of dump trucks are deployed in proportion to the excavators.

A loading machine for performing the loading of ore and other rocks, and further, soil and sand is an excavator having a bucket, and is arranged at a predetermined excavation work position. At this position, the bucket is actuated to perform excavation work, and a revolving upperstructure is turned to displace the bucket to a position above a haulage machine to dump excavated materials into the vessel of the haulage machine. When the excavator is arranged at the predetermined position, a dump truck as the haulage machine is arranged at a position where the loading work is feasible, and a more desired position of the haulage machine is a position where loading can be efficiently and quickly performed from the loading machine, this position being a target loading position.

In a case where the loading machine is a self-propelling excavator equipped with a crawler-type travel means, this loading machine can move as needed. However, the relative positional relation between the loading machine and each haulage machine is normally set constant. Accordingly, the loading machine is initially arranged at a position of work to be performed, and as a consequence, a target loading position is determined based on the position of the loading machine.

As the loading machine is equipped with the travel means, its working position is movable as needed. However, this movement is not performed very frequently. Even when the loading machine moves, it moves only a little distance in general. Therefore, the initial position of the loading machine, in other words, the geographical position of the loading machine at the time of initiation of work is detected, and the position of the loading machine is changed whenever the loading machine has moved. For this purpose, the loading machine is provided with an input means, and by this input means, an initial value of the target loading position is inputted and a position adjustment is performed whenever the loading machine has moved.

The haulage machines has a function to detect the position and the direction of the movement. Therefore, the haulage machine is provided with a haulage machine detection means to detect its current position of the geographical position. The geographical position of the haulage machine can be acquired by using a measurement system based on GNSS (Global Navigation Satellite System including GPS and the like). To use this GNSS, it is necessary to install a GNSS receiver on each haulage machine. The position, more preferably the position and direction of one of the haulage machines, is set as a target loading position which allows to perform loading work as a most efficiently when the haulage machine is brought into closed position to the loading machine. After that, information on this target loading position is transmitted to the succeeding haulage machines as long as no change is made. The approach of the haulage machines to this target loading position is performed one after one. For this purpose, an instruction is made, for example, to move the haulage machine, which is located at a position closest to the loading machine, toward the target loading position.

Respective haulage machines have been detected their current position by the GNSS receiver, and information can be transmitted by means of a wireless communication means between the respective haulage machines and the loading machine. Therefore, the haulage machine, which should next approach to the target loading position, receives an instruction from the loading machine and moves on toward the target loading position without failure, and the travel of the haulage machine is not interfered by any other haulage machine. Each haulage machine is provided with the display, and at least the target loading position is shown on the display, preferably together with a direction of approach to the target loading position. As an embodiment of this presentation, a figure of the haulage machine is shown at the target loading position, and in addition, an approach route toward the target loading position is also shown on the display. Further, the current position of the haulage machine is also shown. It is set such that, when the haulage machine moves, the image of the haulage machine on the display also moves correspondingly. The driver can, therefore, drive the haulage machine quickly and smoothly to the target loading position by watching the image on the display. If obstruction or the like is exists which may pose a problem for the travel of the haulage machine around the approach route, for example, a route that allows traveling so as to circumvent the obstruction or the like can be shown as a new approach route.

It is to be noted that the target loading position is determined based on the position where the loading machine is arranged and also that the direction of approach of the haulage machine to the target loading position is determined. When the loading machine is shifted of a position where work is to be performed or is moved to a position where next work is to be performed, these target loading position and approach direction are reset. The setting of the position can be performed by actually allowing the haulage machine to travel. The haulage machine is, therefore, operated to move to a position where loading can be performed efficiently and quickly from the loading machine. The direction of approach of the haulage machine can be set once its position is determined. In this case, the direction of its approach is not required to be the direction in which the haulage machine actually moved upon setting the target loading position. It is only necessary to show, in view of the arrangement of the haulage machine at the target loading position as shown on the display, a landform and the like, a direction in which the haulage machine can approach most quickly and, moreover, safely. Upon allowing the haulage machine to approach to the target loading position, it is desired to perform the approach by using the haulage machine driven by a skilled driver. If it does not mind taking a little more time, however, the leading one in the order of approach of the haulage machines may be used. When the target loading position and approach direction are set and shown on the display, the use of this presentation on the display as a lead makes it possible to avoid the occurrence of variations in the operation for arranging the haulage machines easily and quickly at the target loading position, even if there are substantial differences in the skill of the drivers of the haulage machines.

The haulage machine travels after the loading has been performed thereinto and performs unloading at a predetermined position. Upon performing this unloading, it is also desired to set an unloading position as a target. Concerning this unloading position, there is no standard position like that the loading machine is placed at the time of loading. Moreover, after unloading work is continued at the same position, no space becomes available for unloading works so that a need arises for a change in the unloading area. It is, therefore, desired to also set an unloading position and to show it on the display of the haulage machine.

The haulage machine are loaded not only ore but also soil and rocks which do not contain ore at a mine. The unloading area may be included in addition to a dumping area for soil, rocks and the like an ore processing area as facilities where equipment for subjecting ore to treatment and processing are arranged. At the mine, an administration center is arranged. It is possible to determine an unloading position at the administration center and to transmit data on the position which serves as a target position upon unloading from the administration center to the haulage machine by showing the target unloading position on the display of the haulage machine. It is more preferred to permit grasping at the administration center a situation such as how much space remains at the unloading area. For this purpose, each haulage machine is provided with a camera to permit capturing an image of the unloading area and transmitting it to the administration center. It is also set to transmit data on the frequency number of unloading by each haulage machine from the haulage machine to the administration center.

Advantageous Effects of the Invention

According to the present invention, it is supported to place positioning and directing haulage machines at a optimal for loading work by a loading machine, thereby the haulage machines being easily and quickly delivered to the precise target loading position.

MODES FOR CARRYING OUT THE INVENTION

Based on the drawings, a description will hereinafter be made about embodiments of the present invention. It is to be noted that in the following description, a mine, in which a plurality of excavators are arranged as loading machines and a number of dump trucks are operating as haulage machines, is assumed to be a work site and the support system according to the present invention is used for supporting at the mining work site on the mining of ore. Needless to say, the present invention shall, however, not be limited to mining at a mine.

Figure 1:
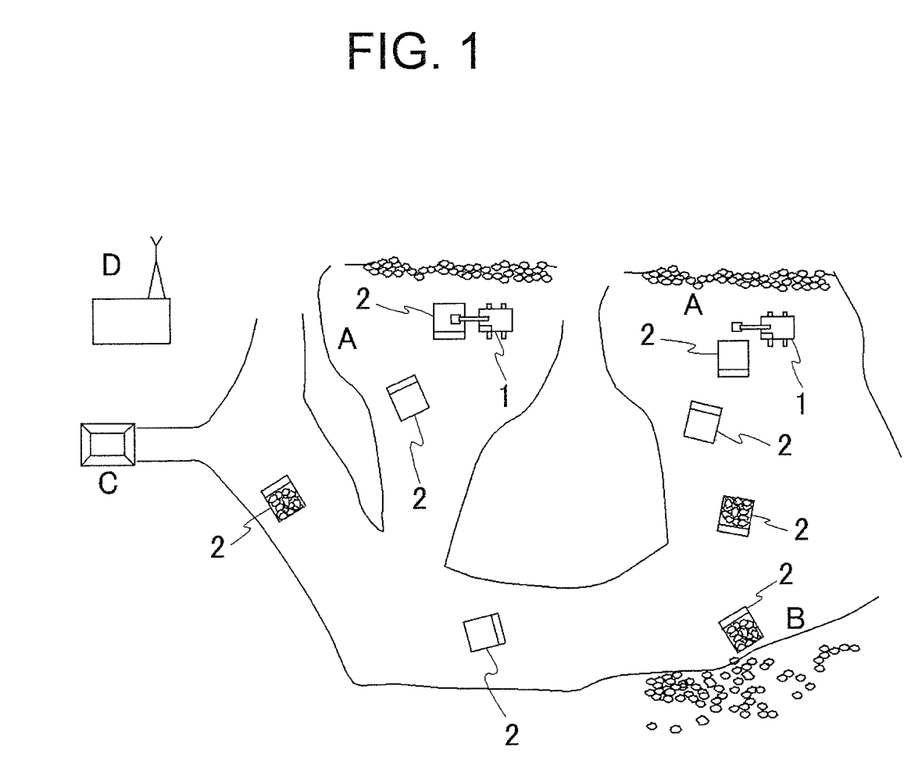
FIG. 1 is an illustration diagram showing a field site where mining of ore at a mine is performed.

In FIG. 1, there are shown ore excavation areas A, a soil and rock dumping area B, and an ore processing area C as facilities for treating and processing mined ore, said ore processing area being provided with a crusher and the like. Further, D designates an administration center for centrally managing the operation of various machines and the like at the mine. At each excavation area A, plural excavators 1 are arranged at different places, respectively, and the excavation at each excavation area A is conducted by the excavators 1. Reference numeral 2 indicates a large number of dump trucks arranged as haulage machines. At the excavation area A, each dump truck 2 hauls materials, which have been excavated by the excavator 1, to the ore processing area C or the dumping area B, unloads the materials at a predetermined place in the ore processing area or dumping area, and then returns to the position where it receives loading from the excavator 1. These haulages are unloaded and returned repeatedly.

Because overburden is excavated by the excavators 1 in the initial stage of excavation at the excavation area A, soil and rocks which do not contain ore are loaded into the dump trucks 2 and these soil and rocks are unloaded at the dumping area B. Upon commencement of mining of ore, the dump trucks 2 move to the ore processing area C where processing facilities for the excavated ore are arranged, and unload the excavated ore. At this processing area C, processing such as crushing of ore, for example, with a crusher is performed.

Figure 2:
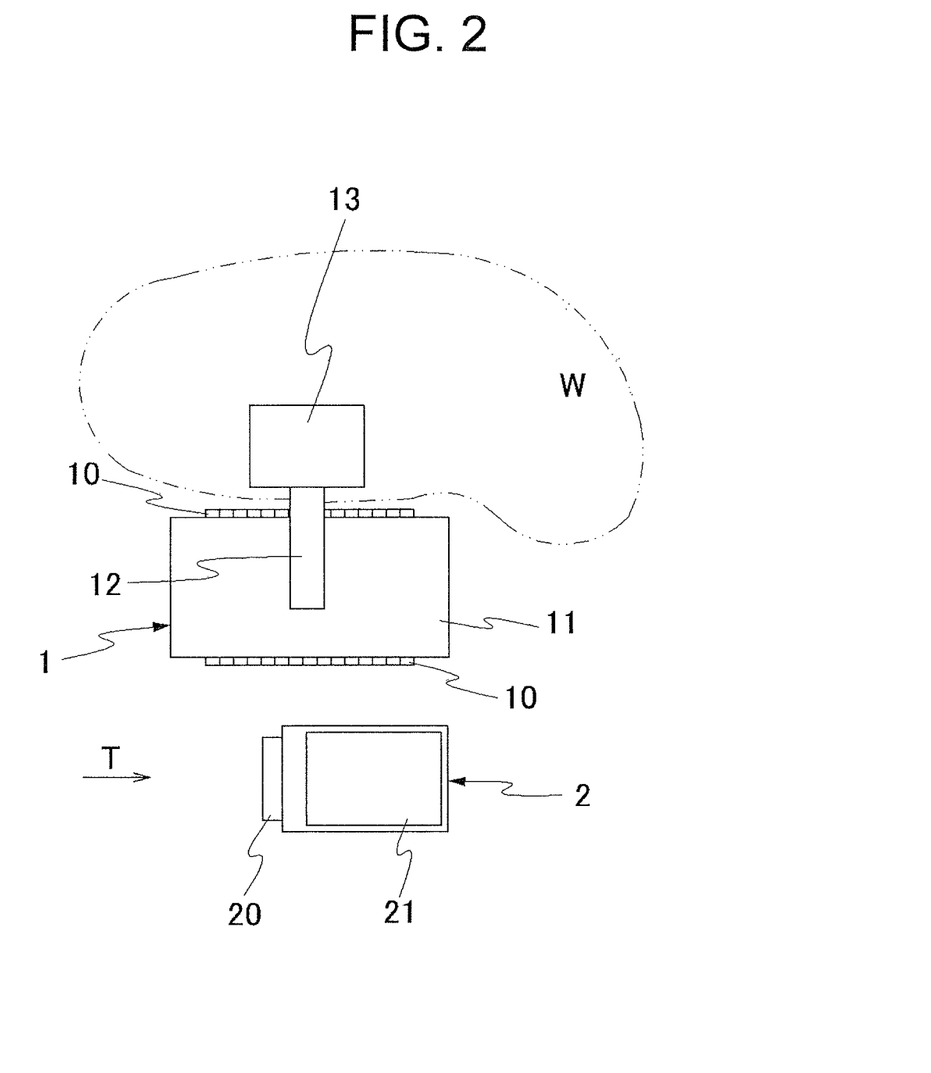
FIG. 2 is an illustration diagram showing one example of arrangement of an excavator and a dump truck, into which materials excavated by the excavator are loaded, at the mining site of ore.

FIG. 2 schematically shows a scene in which the transfer of excavated materials between the excavator 1 and the dump truck 2 is being conducted. In the embodiment of FIG. 2, the excavator 1 has a crawler-type travel base 10, a front mechanism 12 is attached to a revolving upper structure 11, and a bucket 13 is arranged at a free end of the front mechanism 12. The excavator 1 can travel by the travel base 10. However, the excavator 1 does not frequently travel, and excavation is conducted by the bucket 13 within a reach of the front mechanism 12. A range W is a range in which excavation can be conducted without moving the excavator 1. When excavation has been conducted by the bucket 13, the bucket 13 is swung by the revolving upperstructure 11 and the materials excavated by the bucket 13 are dumped into the dump truck 2 as a haulage machine.

The dump truck 2 is provided with a vessel 21 at a position rearward of a cab 20, and the excavated materials dumped from the bucket 13 of the excavator 1 are loaded into the vessel 21. Therefore, the dump truck 2 is located at a position underneath the dumping position of excavated materials by the bucket 13, but during the loading work of excavated materials, the front mechanism 12 is driven and the revolving upperstructure 11 is turned. The position of the dump truck 2 may, therefore, be changed a little by the travel base 10. For performing work, however, it is convenient that the dumping position of excavated materials remains as unchanged as possible. The loading position of excavated materials into the dump truck 2, therefore, does not change frequently.

Upon loading excavated materials into the dump truck 2, the dump truck 2 is at a position close to the excavator 1, and in general, the dump truck 2 reverses to approach to a position where the excavated materials are to be loaded from the excavator 1. The stop position of the dump truck 2 should be set at a position optimal for receiving the excavated materials from the bucket 13 of the excavator 1, in other words, should be a target loading position. For example, with a precondition that the dump truck 2 does not interfere with the revolving upperstructure 11 upon its turning when the dump truck 2 is directed substantially in parallel to the travel base 10 of the excavator 1, the target loading position is set at a position closest to the excavator 1, and the vessel 21 is arranged against a direction in which the bucket 13 of the excavator 1 dumps excavated materials after excavation. Therefore, the dump truck 2 is generally traveled backwardly as indicated by arrow T in FIG. 2 to move toward the target loading position.

The work site where the loading work is performed is the mine, and hence, there is no target mark or the like that would serve as a lead in finding the loading position for the dump truck 2. Moreover, the dump truck 2 generally moves backwardly to approach toward the loading position. Therefore, it is difficult to arrange the dump truck 2 precisely at the suitable loading position. An operation such as repeatedly steering the vehicle right and left is required, thereby involving a potential problem that a lot of time may be taken to stop the dump truck 2 precisely at the target loading position. From the foregoing, the dump truck 2 is provided with a assistance system for positioning to smoothly and exactly move it to the aimed target loading position.

Figure 3:
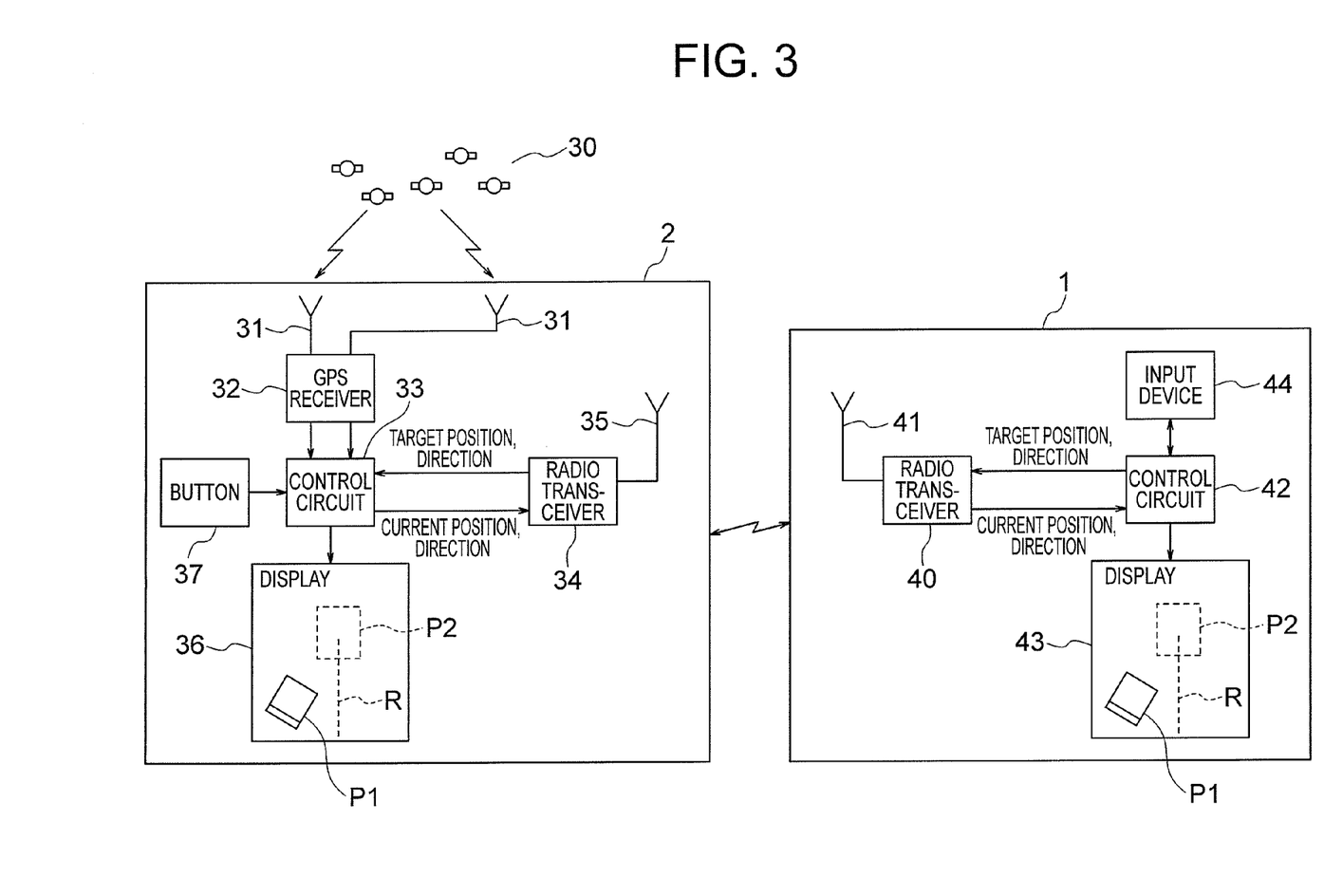
FIG. 3 is a block construction diagram depicting a setting system for a target loading position, which makes up an assistance system according to the present invention.

The construction of this assistance system is shown in FIG. 3. The dump truck 2 is so constructed as to travel in a field and is permitted to detect the geographical position and moving direction. For this purpose, GPS antennas 31, 31 are arranged in a pair to wireless communication apparatus to communicate with plural GPS satellites 30 that make up a global navigation satellite system. Signals received from these paired GPS antennas 31 are inputted in a GPS receiver 32 to detect the position and moving direction of the dump truck 2. Signals of the position and moving direction of the dump truck 2 are inputted in a control circuit 33.

A wireless communication apparatus 34 is connected to the control circuit 33, and the wireless communication apparatus 34 serves to transfer the information with the side of the excavator 1 via an antenna 35. Further, a display 36 is connected to the control circuit 33, and on this display 33, a current position image P1 of the dump truck 2 is shown. On the display 36, the target loading position for the dump truck 2 from the excavator 1 is also shown as a target position image P2 as will be described hereinafter, and an approach route R to the target position image P2 is also shown to indicate the direction of the dump truck 2 at the target loading position.

The current position and moving direction of the current position image P1 are shown in the display 36 in the manner that they can be recognized. The current position and moving direction of the dump truck 2 can be recognized in light of the data produced at the GPS receiver 32. At the control circuit 33, image signals to be shown on the display 36 are, therefore, produced based on these information. The display 36 is provided with plural buttons 37 as switches. By pressing one of the buttons 37, said one button being for displaying images, an image is shown on the display 36.

On the other hand, image information on the target position image P2 and the approach route R to the target position image P2 is set in relation to the excavator 1. For this purpose, a wireless communication apparatus 40 is arranged on the side of the excavator 1 to perform a transfer of information with the wireless communication apparatus 34 of the dump truck 2, and this wireless communication apparatus 40 is provided with an antenna 41. The wireless communication apparatus 40 is connected to a control circuit 42, and a display 43 being connected to this control circuit 42. The target position image P2 and the approach route R to the target position image P2 are shown on the display 43. The position of the target position image P2 is set by the control circuit 42 on the side of the excavator 1, and can be set or changed via an input device 44.

As already described above, the current position image P1 is displayed based on signals of the position and direction of the dump truck 2 as detected by the GPS receiver 32. On the other hand, the target position image P2 can be recognized by measuring, in relation to the excavator 1, the position and direction of the dump truck 2 that enable smooth and precise dumping of excavated materials from the bucket 13 of the excavator 1 and detecting the position and direction of the dump truck 2 at that time. The information so recognized is recorded and set in the control circuit 42. Although sufficient if these detection data are kept shown on the display 36 of the dump truck 2, the detection data on the position and direction of individual dump truck 2 are stored in the control circuit 42 of the excavator 1 because plural dump trucks 2 make accesses to the excavator 1.

The excavator 1 is of the self-propelling type having the travel base 10, but the work of excavation and dumping of excavated materials into the dump trucks 2 is repeated plural times in the state that the excavator 1 remains stopped at the predetermined position. Therefore, the target loading position is kept unchanged during this period. When the vessel 21 of one of the dump trucks 2 has been filled up with excavated materials and the dump truck 2 has moved away, one of the waiting dump trucks 2 approaches to the same target loading position in place of the first-mentioned dump truck 2. This is repeated sequentially. As has been described above, the range in which the excavator 1 can perform excavation at the same position, in other word, without movement, is the range W shown in FIG. 2, and the target loading position remains at the same position as long as excavation is performed within this range W.

Figure 4:
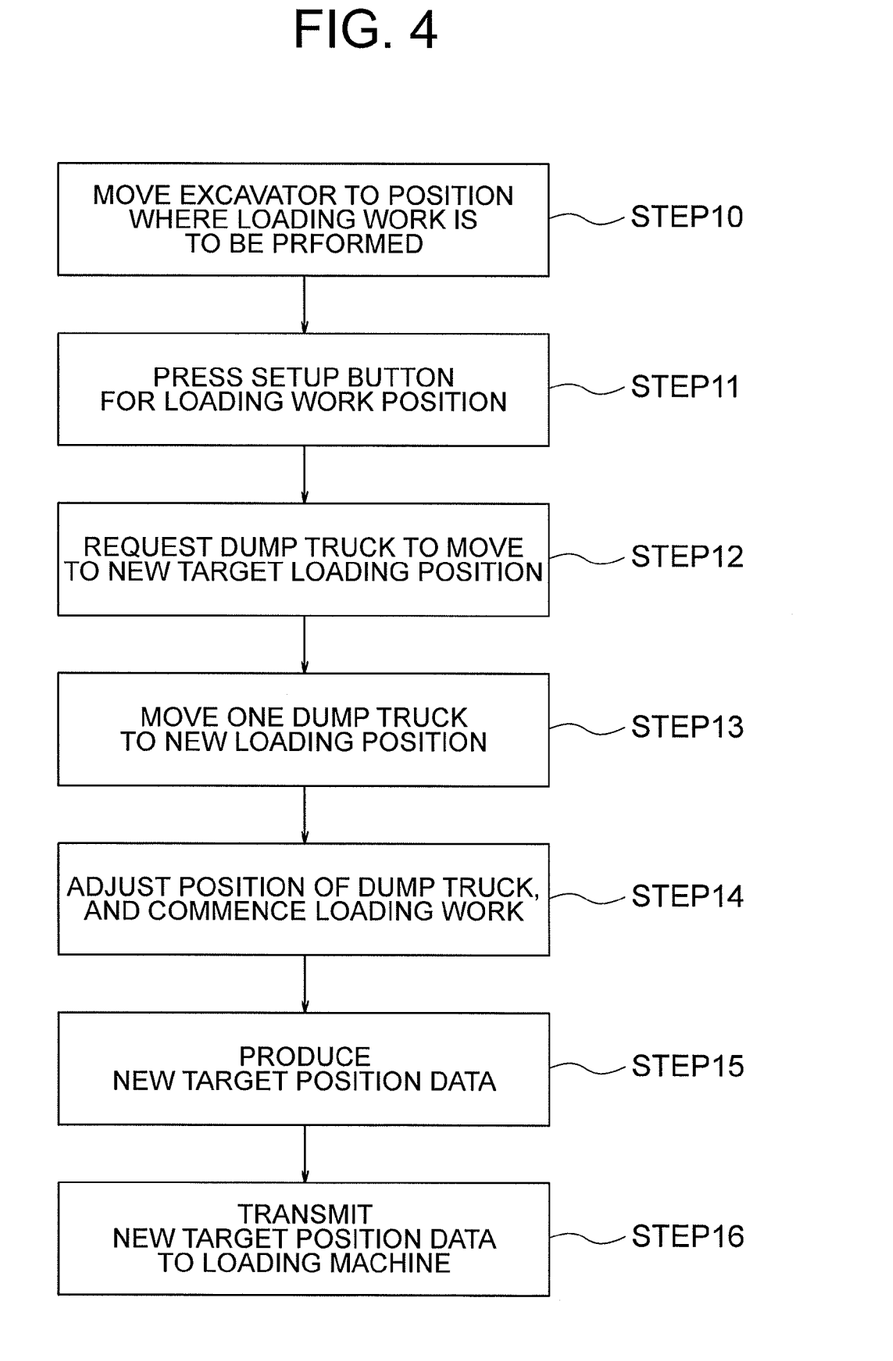
FIG. 4 is a flow chart diagram illustrating steps, as a support, for setting a target loading position and an approach direction to it for the dump truck when the dump truck approaches to the target loading position.
Figure 5:
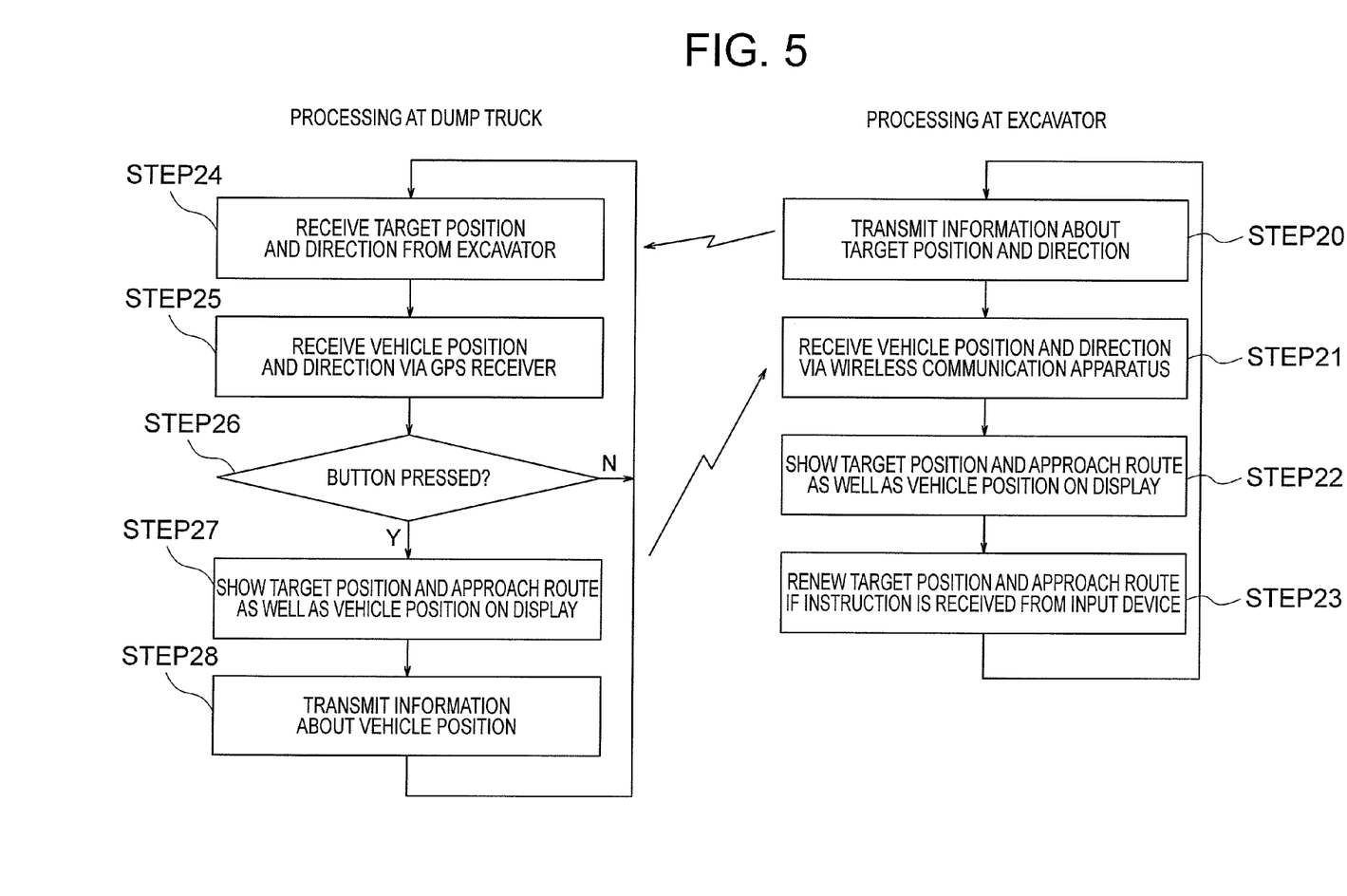
FIG. 5 is a flow chart diagram showing steps for approaching the dump truck to the target loading position.

Shown in FIG. 4 and FIG. 5 are explanation the method for guidance as a support for the dump truck 2 to approach to the target loading position. The guidance is carried out as a presentation on the display 36. FIG. 4 illustrates steps for setting the target loading position, and FIG. 5 shows steps for allowing the dump truck 2 to approach to the thus-set target loading position and performing a replacement.

First, when the excavator 1 has been arranged at a predetermined excavation work position or when the excavator 1 has been moved from one excavation work position to another excavation work position to arrange it at a position where excavation work can be commenced (step 10), one of the plural buttons 37 which is so arranged on the display 36 as being a setup button for setting a target loading position is pressed (step 11). As a result, a request for movement to the target loading position is sent to the dump trucks 2 (step 12). Here, the request for movement to the target loading position is transmitted to all the dump trucks 2, and one of these dump trucks 2 responds to the movement request and commences a movement (step 13). It is the one dump truck 2 that responds to the movement request. Here, the priority is given to the one closest to the excavator 1, or the dump truck 2 driven by a skilled driver (who can be a driver having the highest level of skill). The designation of the skilled driver for a position adjustment makes it possible to quickly and precisely perform the position adjustment, while the designation of the dump truck 2 at the position closest to the excavator 1 makes it possible to quickly commence adjustment work of the target loading position.

Upon arranging the designated dump truck 2, which has been arranged at the predetermined position, at the target loading position proper to the excavator 1, an operation of the dump truck 2 is performed while conducting visual confirmation by the driver (step 13). When the dump truck 2 has been arranged at the target loading position in a state of being directed in the predetermined direction, the geographical position of the dump truck 2 is detected by the GPS receiver 32. From this geographical position, the target loading position and direction for the succeeding dump trucks 2 are determined, and their approach route R is also specified. The position and direction of the dump truck 2 are determined by the control circuit 42 of the excavator 1, and data on the geographical position of the dump truck 2 at the target loading position and the approach route R are stored. In addition to the foregoing, the loading work of excavated materials is commenced (step 14) for this dump truck 2 arranged at the target loading position. These data are then transmitted to the excavator 1 via the wireless communication apparatuses 34, 40, and target loading position data are produced at the control circuit 42 of the excavator 1 (step 15), and the target loading position data area transmitted to the part of the excavator 1 (step 16). The data on the target loading position for the excavator 1 arranged at the predetermined position and the approach route R to it are produced as described above.

Although the data on the target loading position and direction for the excavator 1 and the approach route R to the target loading position are produced as described above, these data are held in the excavator 1 in question but not recorded in respective dump trucks 2. The dump trucks 2 then approach one after one to the target position for loading by the excavator 1, whereby being helped for performing to introduce each dump truck 2 to the target loading position.

Described specifically, as shown in FIG. 5, the excavator 1 and each dump truck 2 are provided with the wireless communication apparatuses 40, 34 in addition to the antennas 41, 35, respectively. The target to be loaded by the excavator 1 is a specific dump truck 2 among the plural dump trucks 2. When the specific dump truck 2 has come close to the excavator 1, the data on the target position image P2 and the approach route R are transmitted from the control circuit 42 of the excavator 1 to the control circuit 33 of the dump truck 2 (step 20). As will hereinafter be described in detail, the information on the current position image P1 of the dump truck 2 as acquired from the GPS receiver 32 on the side of dump truck 2, that is the information about the current position and direction of the dump truck 2 has been transmitted by way of the wireless communication apparatus 34 (see step 28), and are received by the wireless communication apparatus 40 of the excavator 1 (step 21). The information is then shown on the display 43 (step 22). As a consequence, the driver can confirm the current position image P1 and target position image P2 of the dump truck 2 and, moreover, the approach route R to the target position image P2. It is to be noted that, when it is desired to change the position of the target position image P2 from the excavator 1, the target position image P2 can also be renewed using the input device 44 (step 23). The target position renewed as described above is communicated to the dump truck 2 in step 20, a new target position image P2 and a new approach route R to it are set, and the succeeding dump truck 2 is utilized by operating the input device 44. It is also to be noted that the target position renewed in step 423 is recorded in the control circuit 42.

On the side of the dump truck 2, on the other hand, the transmission of the data on the target position image P2 and the approach route R to it is received from the part of the excavator 1 (step 24), and the information on the current position image P1 is received via the GPS receiver 32 (step 25). The dump truck 2 stands there in readiness until the button 37 is pressed (step 26). When the button 37 is pressed, the display 43 is lit via the control circuit 33 or, if another image has already been shown on the display 43, the screen is switched. As a result, the target position image P2 and the approach route R to it are shown on the display 36, and the image on the position and direction of the dump truck 2 as having been received via the GPS receiver 32, that is, the current position image P1 is also shown (step 27). The target position image R2 and approach route R are shown as still images. When the dump truck 2 commences traveling, however, the screen turns into a video image screen with the current position image P1 changing from moment to moment in position. Data on the current position image P1, which is changing from moment to moment, are transmitted to the control circuit 42 of the excavator 1 via data communication means (step 28).

Now, the driver of the dump truck 2 operates the vehicle such that the current position image P1 moves onto the approach route R. When the current position image P1 is brought into registration with the target position image P2, the position is the target loading position for the dump truck 2, where the loading of excavated materials is performed by the excavator 1. As the position adjustment of the dump truck 2 is performed based on manner as mentioned above, the position adjustment can be performed quickly and precisely without conducting an operation such as adjustments of the position and direction of the vehicle by steering. Even if there are differences in skill among the drivers of the dump trucks 2, the time required for each dump truck 2 to approach to the target loading position becomes substantially constant, and moreover, the work efficiency is improved.

In addition, a GPS receiver may also be mounted on the excavator 1. By detecting the position and direction of the excavator 1, calculating the target position from the position and direction of the excavator 1 in a loading posture, and recording the target position as a target loading position, assistance can be provided for the dump trucks 2 from shortly after a movement of the excavator.

When excavated materials have been loaded to the full capacity level of the dump truck 2 as mentioned above, the dump truck 2 moves toward the dumping area B or the ore processing area C, where unloading work of the payload is conducted. The dump truck 2 is travel toward dumping area B when the excavated materials do not contain ore like overburden or the like, while ore is loaded, the dump truck 2 travels toward the ore processing area C, and the dump truck 2 is reached, the vessel 21 of the dump truck 2 is operated to dump, in other words, unload the payload. This unloading work is conducted under the management and control by the mine administration center D.

At the mine administration center D, the dump trucks 2 deployed in the large number are managed all together. For this purpose, the dump trucks 2 as many as N (N: an integer of 2 or greater) can make communication with a management system 50 in FIG. 6. As mentioned above, the N dump trucks 2 each have the GPS antenna 31, GPS receiver 32, wireless communication apparatus 34 and antenna 35, and are each also equipped with the display 36 and buttons 37. Further, the control circuit 33 has an image capture system 33a, and the dump trucks 2 are provided with back cameras 38, respectively. Each back camera 38 is to acquire a rearward view image of the corresponding dump truck 2, and image signals from the back camera 38 are inputted to the image capture system 33a of the control circuit 33. Furthermore, each dump truck 2 is also provided with an unloading sensor 39 for detecting lifting and lowering operations of the vessel 21. Detection signals of the unloading sensor 39 are also inputted to the control circuit 33.

Figure 6:
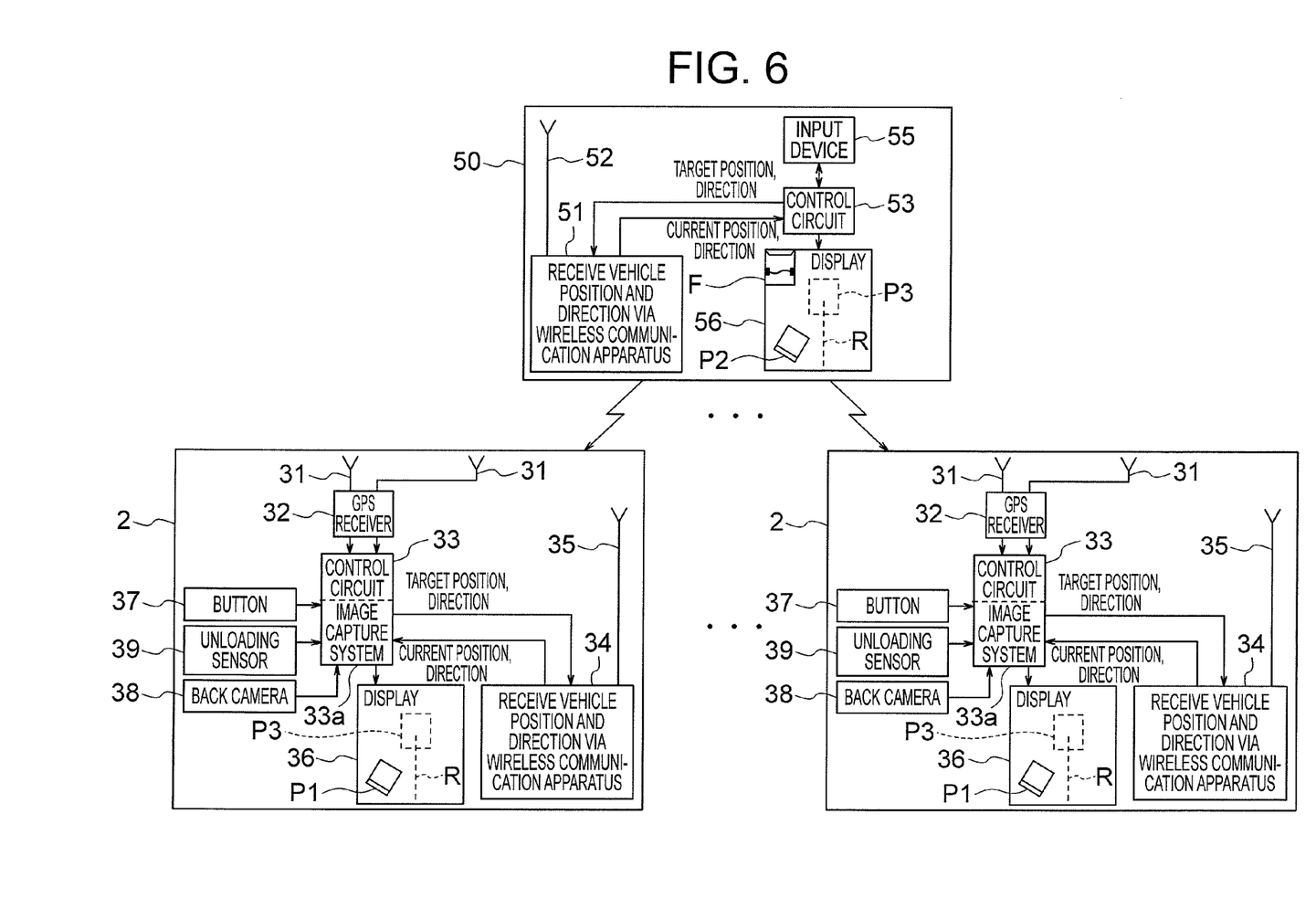
FIG. 6 is a block construction diagram depicting a system for setting an unloading position for the dump truck by a administration center.

As described above, the signals from the back camera 38 and unloading sensor 39 are transmitted from the control circuit 33 to the mine administration center D via the wireless communication apparatus 34. The mine administration center D is equipped with the management system 50, and the management system 50 is equipped with a wireless communication apparatus 51 and an antenna 52 to perform a transfer of signals with each dump truck 2. The wireless communication apparatus 51 is connected to a control circuit 53. Included in such signals are information on the current position of at least one of the plural dump trucks 2, an image of the back camera 38 from the image capture system 33a, and an operation signal from the unloading sensor 39.

The control circuit 53 is connected to a display 56. On the display 56, the dumping area B for the dump trucks 2 or the ore processing area C, specifically a target position image P3 for the dump trucks 2 on the unloading side and an approach route R to the target position image P3 are shown together with the current position image P1. In the excavation area A, dump trucks 2 frequently travel to and from each excavator 1 when plural excavators 1 are operating there. Therefore, the unloading space for payloads will no longer be available upon elapse of a certain time. To determine whether or not this space is available, a capture image F by the back camera 38 of each dump truck 2 is shown on the display 56 in addition to the target position image P3 for the dump truck 2 and the approach route R to it and the current position image P1.

Figure 7:
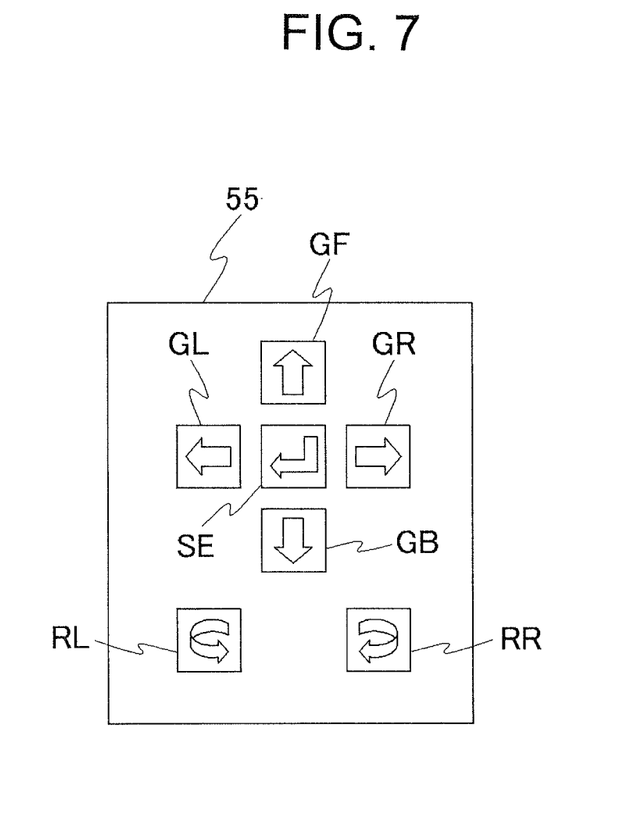
FIG. 7 is an illustrative construction diagram of the construction of an input device at the administration center.

By counting the number of unloading based on capture images F shown on the display 56 of the management system 50 and signals, which indicate the occurrence of unloading, from the unloading sensors 39 of the respective dump trucks 2, it is thus possible at the mine administration center D to determine whether or not the unloading of the dump truck 2 is feasible. When unloading becomes unable state at the area, the position of the target position image P3 shown on the display 56 is changed to set a new unloading area. To change the position of the target position image P3 as described above, the management system 50 is provided with an input device 55. This input device 55 can be configured, for example, as illustrated in FIG. 7. Described specifically, the input device 55 includes buttons GF, GB, GR, GL for rectilinear movements in four directions, i.e., forward and backward and rightward and leftward, and leftward and rightward turning buttons RR, RL, and a setup button SE is also arranged. By controlling this input device 55, the position of the target position image F on the display 56 can be adjusted. Image signals on this target position image P3 and an approach route R to it are then transmitted to the dump truck 2, and a renewed target position image P3 is immediately shown on the display 36 of the dump truck 2. By allowing the dump truck 2 to travel while referring, as a lead, to the target position image P3 and the approach route R to it, its payload can be unloaded smoothly and quickly at the proper unloading area.

LEGEND

1 Excavator
2 Dump truck
30 GPS satellite
32 GPS receiver
33, 42, 53 Control circuit
34, 40, 51 Wireless communication apparatus
36, 43, 54 Display
38 Back camera
44, 55 Input device
50 Management system
A Excavation area
B Dumping area
C Ore processing area
D Mine administration center
P1 Current position image
P2 Target position image
R Approach route

The invention claimed is:

1. An assistance system of haulage machines adapted to travel between a loading position and an unloading position to assist in positioning of said haulage machines for loading work from a loading machine, comprising:
   a travel base provided for said loading machine adapted to move to and from said loading position;
   a target loading position information recorded for said loading machine to perform loading work from said loading machine to each of said haulage machines;
   a control circuit provided for said loading machine to renew said target loading position information after movement of said loading machine;
   a haulage machine detector provided for said haulage machines to respectively detect the current position of said haulage machines;
   a wireless communication apparatus for transmitting said target loading position information from said loading machine to said haulage machines; and
   a display provided on each of said haulage machines to show said target loading position information for each of said haulage machines and a current position of each of said haulage machines, wherein
   each of said haulage machines is navigated to said target loading position based upon assistance of said display.

2. An assistance system of haulage machines for positioning of said haulage machines according to claim 1, wherein one of said haulage machines is placed at a position corresponding to said target loading position of said loading machine of said haulage machine and a geographical position of said haulage machine is detected and said geographical position of said haulage machine is recorded as data of said target loading position for succeeding haulage machines in said control circuit, and said display of said succeeding haulage machine shows said target loading position by being received information from said control circuit by way of said wireless communication apparatus.

3. An assistance system of haulage machines for positioning of said haulage machines according to claim 2, wherein said display is adapted to show said target loading position and an approach route to said target loading position.

4. An assistance system of haulage machines for positioning of said haulage machines according to claim 1, wherein said haulage machines are adapted to make communication with an administration center in an area where bulk is to be unloaded by said haulage machines, and said administration center is determined and recorded an unloaded position and an approach route, and transmits information to said haulage machines respectively by way of wireless communication.

5. An assistance system of haulage machines for positioning of said haulage machines according to claim 2, wherein said haulage machines are adapted to make communication with an administration center in an area where bulk is to be unloaded by said haulage machines, and said administration center is determined and recorded an unloaded position and an approach route, and transmits information to said haulage machines respectively by way of wireless communication.

6. An assistance system of haulage machines for positioning of said haulage machines according to claim 3, wherein said haulage machines are adapted to make communication with an administration center in an area where bulk is to be unloaded by said haulage machines, and said administration center is determined and recorded an unloaded position and an approach route, and transmits information to said haulage machines respectively by way of wireless communication.

* * * * *